Figures 1, 2:
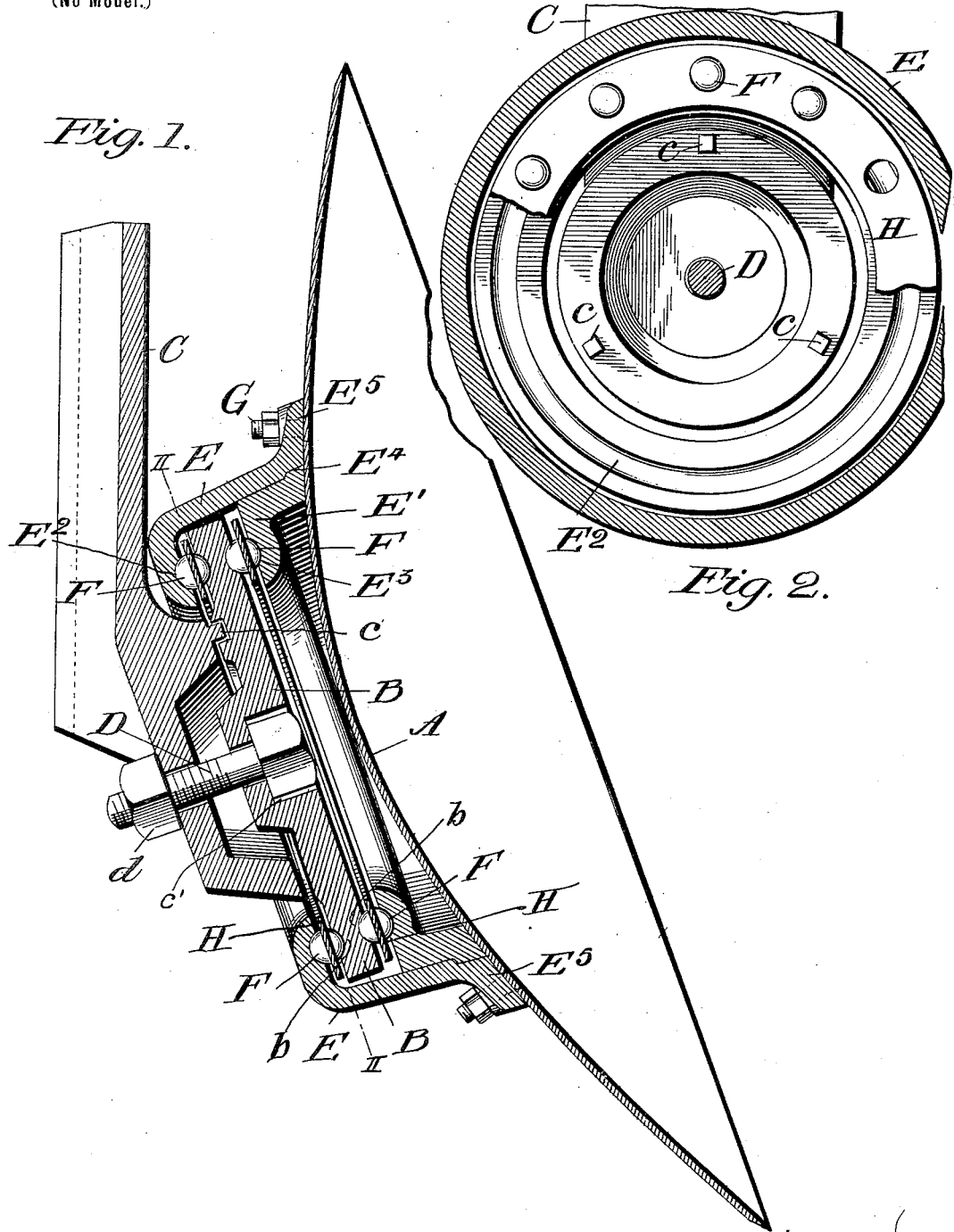

No. 657,894. Patented Sept. 11, 1900.
C. H. MELVIN.
DISK BEARING.
(Application filed July 30, 1900.)
(No Model.)

WITNESSES:
INVENTOR
Charles H. Melvin
By
Attorney

United States Patent Office.

CHARLES H. MELVIN, OF MOLINE, ILLINOIS, ASSIGNOR TO THE DEERE & COMPANY, OF SAME PLACE.

DISK-BEARING.

SPECIFICATION forming part of Letters Patent No. 657,894, dated September 11, 1900.

Original application filed June 12, 1900, Serial No. 20,048. Divided and this application filed July 30, 1900. Serial No. 25,322. (No model.)

*To all whom it may concern:*

Be it known that I, CHARLES H. MELVIN, a citizen of the United States, residing at Moline, in the county of Rock Island and State of Illinois, have invented certain new and useful Improvements in Disk-Bearings; and I do hereby declare the following to be a full, clear, and exact description of the invention, such as will enable others skilled in the art to which it appertains to make and use the same.

This invention relates to disk-bearings of the character shown and described in my application for a patent filed in the Patent Office June 12, 1900, Serial No. 20,048, and particularly to antifriction-bearings for the cutting-disks of plows and other agricultural implements.

The primary object of the invention is to provide a simple, efficient, durable, and inexpensive antifriction-bearing for disk plows, whereby the disk may be journaled and supported at a point between its center and circumference on an annular series of balls or other suitable antifriction devices interposed between a fixed element or bearing-plate and a rotary element or bearing-plate carried by or revolving with the disk, so that all strain in any direction may be sustained by said bearing-plates and antifriction devices without subjecting the bearings to the great strain and wear incident to prior constructions, in which the disk has its bearings located at its center.

A further object is to provide for the adjustment of the bearings in such manner as to change the positions of the wearing-surfaces, so that excessively-worn portions may be easily shifted into positions in which they are less liable to wear, while new or less-worn parts are brought into positions where the wear is excessive, whereby the bearing-surfaces and antifriction devices are caused to wear evenly, friction is reduced, and the durability of the device increased.

The invention will first be hereinafter more particularly described with reference to the accompanying drawings, which form a part of this specification, and then pointed out in the claims at the end of the description.

Referring to the drawings, in which similar letters of reference are used to denote corresponding parts in the different views, Figure 1 is a vertical sectional elevation of a disk-bearing embodying my invention; and Fig. 2 is a detail front view of a portion of the device with parts broken away, the section being taken on the line II II of Fig. 1.

The letter A in the drawings may denote an ordinary concavo-convex cutting-disk secured in rotative engagement with a fixed part or bearing-plate B, attached to the plow-standard C, so that the disk has its bearings on antifriction devices arranged in annular series between confronting bearing-surfaces on said support and an element arranged to rotate with the disk. In the form shown a bearing-plate or disk B, having annular bearing-surfaces $b$ $b$ on opposite sides thereof at or near its circumferential portion, is secured to the hanger or standard C by means of a fastening-bolt D, which preferably has a polygonal or squared head fitting a correspondingly-shaped recess $c'$ in the front face of the bearing-plate B and passes thence through an aperture in the foot of the standard and has a nut $d$ screwed on its projecting end. The back or rear side of the plate B may have a lug or lugs thereon adapted to engage properly-located recesses in the front face of the foot of the standard C, or vice versa, to prevent the bearing-plate from turning, while permitting it to be rotated about the fastening-bolt D when desired by loosening the nut on said bolt for the purpose of changing the wearing-surfaces of the ball-races, so as to compensate for the difference in wear upon those parts of the races and antifriction devices which wear more rapidly than other parts in actual use, thereby causing the bearing-surfaces to wear evenly, reducing the friction, and increasing the durability of the device.

E and E' denote a two-part annulus secured to the back of the disk A and having depending flanges, in the confronting faces of which are formed annular ball-races or bearing-surfaces $E^2$ $E^3$, which are preferably concave to receive the convex surfaces of an annular series of balls F, said annulus embracing or straddling the circumferential portion of the bearing-plate B, so that the bearing-surfaces or races formed thereon confront the corresponding bearing-surfaces or races of the bearing-plate. Each of the parts E and E' may consist of a ring-like portion having a pendent flange or portion extending at an angle to the main portion thereof and in which the annular ball-race or bearing-surface is formed, the peripheral portion of the bearing-plate being confined between said flanges. The part E' may have a lug or lugs $E^4$ thereon for engagement with a recess or recesses in the under side of the part E, by which it is surrounded, or vice versa, so as to prevent rotation of said part E' with respect to the part E, the part E' being retained in proper position against the back of the disk by the surrounding part E, within which it is fitted, while the part E may be rigidly secured to the disk A by suitable bolts and nuts, as at G, said bolts passing through apertures in the disk A and having their heads countersunk, so as to lie flush with the surface of the disk, and extending thence through apertured lugs $E^5$ on the main portion of the part E, though any other suitable means may be employed for securing the annulus to the back of the disk. In each of the ball-races, between the confronting bearing-surfaces of the bearing-plate and the annulus, may be fitted an annular series of balls. In operation, the plate B being stationary, the annuli E E' will revolve with the disk A in contact with the double series of balls or antifriction devices confined in the ball-races between said plates and annuli, and when it is desired to shift the bearing-surfaces on account of excessive wear of certain portions thereof the bolt D may be loosened, and the disk B may thereupon be given a partial rotation and again secured in the desired position, thus bringing new or less-worn surfaces into position for wear, while the excessively-worn portions are brought into positions less subject to wear. The balls F in either or both races are preferably separated and held at prescribed distances apart by flat spacing-rings H, having a series of perforations therein to receive or fit over the balls and loosely confine them in their proper places.

I thus provide a very simple and efficient device whereby the disk is supported and has its bearings on antifriction devices arranged outside of and encircling the central portion or hub of the disk at a point between its center and circumference considerably removed from its center, where the leverage is greatly reduced, thus relieving the bearings from much strain to which they are subjected as ordinarily constructed and located—at the center of the disk—whereby the strain and wear on the bearing-surfaces are greatly reduced, and the friction is reduced to a minimum, thereby prolonging the life of the bearing, the strain in any direction being carried on the two annular series of antifriction devices.

I wish it to be understood that I do not desire to make any claim herein to the invention described and claimed in my above-named application, of which this is a division, the claims in the present case being restricted to that modification of the invention which is illustrated and described but not specifically claimed in said original application.

Having thus fully described my invention, what I claim as new, and desire to secure by Letters Patent of the United States, is—

1. A disk-bearing comprising a supporting-standard, a bearing-plate secured to said standard with provision for giving a partial rotation thereto and securing it in different positions, a rotary cutting-disk, and means for securing said disk in rotative engagement with said bearing-plate, together with an annular series of antifriction devices arranged at each side of said bearing-plate and confined between a bearing-surface thereon and a confronting bearing-surface on a rotative member carried by or revolving with the disk, whereby the disk is supported and has its bearings on said antifriction devices grappling said bearing-plate, substantially as described.

2. A disk-bearing comprising a circular bearing-plate and means for securing the disk in rotative engagement therewith, a rotative member carried by the disk straddling the circumferential portion of said bearing-plate, and an annular series of antifriction devices at each side of said bearing-plate confined between the same and a bearing-surface on said rotative member confronting the bearing-surface on said bearing-plate, substantially as described.

3. The combination, in a disk-bearing, of a relatively-fixed part or bearing-plate, a cutting-disk carrying a bifurcated or two-part member embracing the circumferential portion of said bearing-plate, and a series of antifriction devices at each side of said bearing-plate interposed between bearing-surfaces thereon and corresponding bearing-surfaces on said bifurcated member, substantially as described.

4. The combination, in a disk-bearing, of a relatively-fixed part or bearing-plate, a cutting-disk carrying a bifurcated or two-part member embracing the circumferential portion of said bearing-plate, and a series of antifriction devices at each side of said bearing-plate interposed between bearing-surfaces thereon and corresponding bearing-surfaces on said bifurcated member, together with means for holding said antifriction devices at suitable distances apart in their respective races, substantially as described.

5. In a device of the character described, a composite antifriction-bearing for the rotary disk, comprising a relatively-fixed part about which the disk may rotate, an annular series of antifriction devices interposed between confronting bearing-surfaces on said fixed part and an annular portion of a rotary element on the back of the disk, and a second annular series of antifriction devices interposed between confronting bearing-surfaces on the opposite side of said fixed part and said rotary element, substantially as described.

6. In a device of the character described, a composite antifriction-bearing for the rotary disk, comprising a relatively-fixed part about which the disk may rotate, an annular series of antifriction devices interposed between confronting bearing-surfaces on said fixed part and an annular portion of a rotary element on the back of the disk, and a second annular series of antifriction devices interposed between confronting bearing-surfaces on the opposite side of said fixed part and said rotary element, together with means for adjusting and securing said fixed part so as to shift the positions of the bearing-surfaces thereon and of the antifriction devices in such manner as to cause those parts that are least exposed to wear to take the position of excessively-worn portions, substantially as described.

7. In a device of the character described, a composite antifriction-bearing for the rotary disk, comprising a relatively-fixed part or bearing-plate about which the disk may rotate, an annular series of antifriction devices interposed between confronting bearing-surfaces on said bearing-plate and a rotary element on the back of the disk, a second annular series of antifriction devices interposed between the opposite side of said bearing-plate and a confronting bearing-surface on a rotary element surrounding said first-named element, and means for separating and holding said antifriction devices at suitable distances apart in their respective races, together with means for securing and adjusting said bearing-plate so as to shift the positions of the bearing-surfaces thereon and of the antifriction devices in such manner as to cause those parts that are least exposed to wear to take the position of excessively-worn portions.

8. In a device of the character described, the plow standard or hanger and the single circular bearing-plate centrally secured to said standard by a suitable fastening-bolt; one of said parts having a recess or recesses to receive an interlocking lug or lugs on the other part, whereby the bearing-plate may be rotated about said fastening-bolt as a center and secured in different positions, in combination with a composite antifriction-bearing for the disk, comprising a series of antifriction devices interposed between confronting bearing-surfaces on said bearing-plate and a rotary element on the back of the disk, and an annular series of antifriction devices interposed between confronting bearing-surfaces on the opposite side of said bearing-plate and a rotary element on the back of the disk surrounding said first-named element and overlapping the bearing-plate so as to confine the same between said rotary elements, substantially as described.

9. In a device of the character described, the combination with a relatively-fixed part or support, circular in form and a disk journaled thereon, of an annular series of antifriction devices interposed between confronting raceways on opposite sides of the circumferential portion of said fixed part or support and confronting annular members carried by or revolving with the disk at a point between its hub and circumference, substantially as described.

10. In a device of the character described, the combination with a relatively-fixed part or support circular in form and a disk journaled thereon, of an annular series of antifriction devices interposed between confronting raceways on opposite sides of the circumferential portion of said fixed part or support and confronting annular members carried by or revolving with the disk at a point between its hub and circumference, together with means for separating and holding said antifriction devices in relatively-fixed positions in the line of rotation, substantially as described.

In testimony whereof I affix my signature in presence of two witnesses.

CHARLES H. MELVIN.

Witnesses:
F. H. COOPER,
LYSTER J. CHAMBERS.